United States Patent [19]

Spevack

[11] 4,218,431
[45] Aug. 19, 1980

[54] REMOVAL OF SULFIDE CONTAMINANTS FROM CARBONATE WATERS WITH PRODUCTION OF $CO_2$-FREE $H_2S$

[75] Inventor: Jerome S. Spevack, New Rochelle, N.Y.

[73] Assignee: Deuterium Corporation, New Rochelle, N.Y.

[21] Appl. No.: 904,979

[22] Filed: May 11, 1978

Related U.S. Application Data

[63] Continuation of Ser. No. 712,172, Aug. 6, 1976, abandoned.

[51] Int. Cl.² ............... B01D 5/00; G01B 17/16
[52] U.S. Cl. ............... 423/563; 423/561 R; 423/561 B; 210/45
[58] Field of Search ............ 210/42, 47, 52, 59, 210/62 R; 423/563, 566, 110, 232, 210, 220, 224, 225, 230, 231, 234, 235, 522, 561 R, 557, 561 A, 210.45, 210.47; 60/641; 159/16; 23/273 AC; 55/73

[56] References Cited

U.S. PATENT DOCUMENTS

| | | | |
|---|---|---|---|
| 1,108,705 | 8/1914 | Cobb | 423/566 |
| 1,435,471 | 11/1922 | Howard | 423/566 |
| 1,699,808 | 1/1929 | Rinman | 423/561 B |
| 1,835,482 | 12/1931 | Flynn et al. | 423/561 R |
| 2,020,313 | 11/1935 | Holstein | 423/563 |
| 2,378,689 | 6/1945 | Collins | 423/230 |
| 2,624,694 | 1/1953 | Sailors | 423/563 |
| 3,058,807 | 10/1962 | Holland | 423/566 |
| 3,421,850 | 1/1969 | Peterson et al. | 423/561 R |
| 4,102,784 | 7/1978 | Schlauch | 210/47 |
| 4,123,506 | 10/1978 | Spevack | 423/566 |

OTHER PUBLICATIONS

Skoog et al., Fundamentals of Analytical Chemistry, Holt Rinehart and Winston NY, NY, 1963, pp. 147–149, 747–748.
Mellor a Comprehensive Treatise on Inorganic & Theoritical Chemistry Longmans, Green & Co. NY, NY, 1930 vol. X, pp. 142–145.

*Primary Examiner*—O. R. Vertiz
*Assistant Examiner*—Gary P. Straub
*Attorney, Agent, or Firm*—Hall & Houghton

[57] ABSTRACT

Carbonate waters from subterranean and other sources which are contaminated with dissolved sulfides contribute to environmental pollution. Herein the sulfides are removed without otherwise polluting the environment by conversion to insoluble metal sulfide reaction products separable from the carbonate waters with production of $CO_2$-free $H_2S$ as a valuable byproduct. The dissolved sulfides are reacted with metal salt to form an insoluble sulfide reaction product from which the decontaminated carbonate water is separated, the reaction product is then decomposed by reacting with an aqueous acid comprising the negative radical of the metal salt thus producing $H_2S$ essentially free of $CO_2$ as a valuable product. The reformed metal salt is recycled. Conditions are provided for extracting ammonia contained in the carbonate water and for removing arsenic and/or mercury matter therefrom.

45 Claims, 1 Drawing Figure

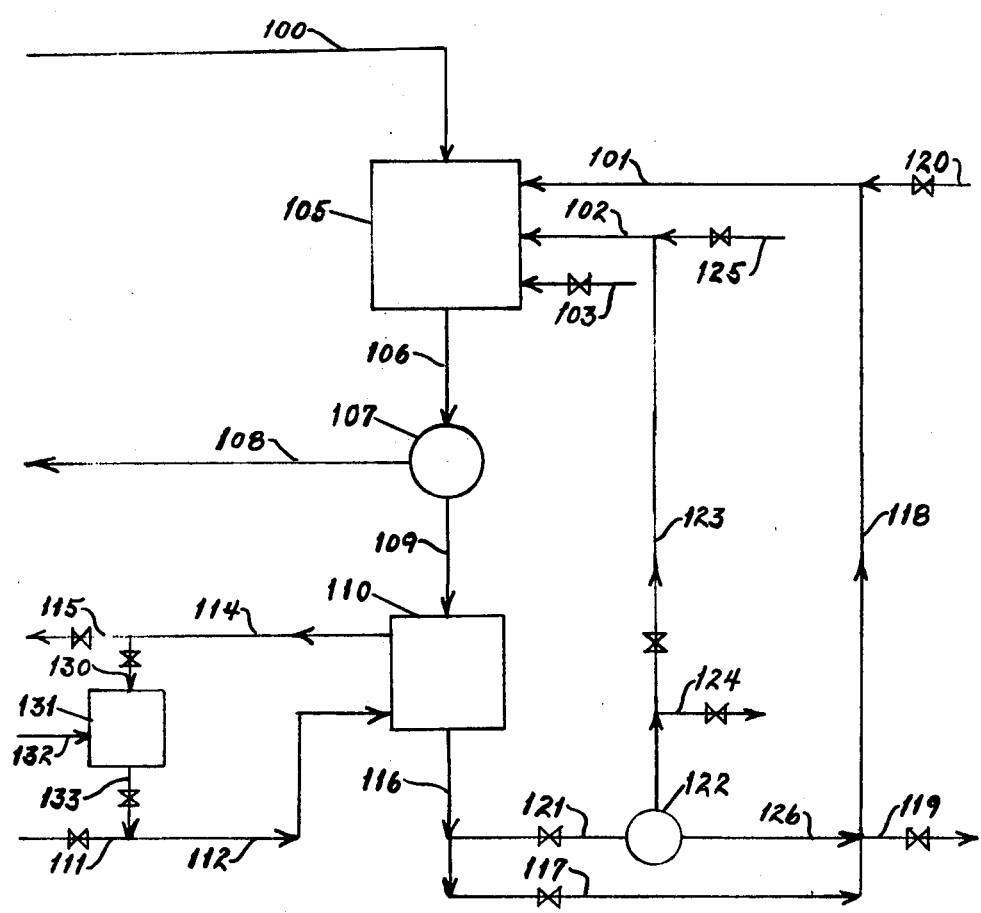

4,218,431

REMOVAL OF SULFIDE CONTAMINANTS FROM CARBONATE WATERS WITH PRODUCTION OF $CO_2$-FREE $H_2S$

This is a continuation of application Ser. No. 712,172 filed Aug. 6, 1976, now abandoned.

BACKGROUND OF THE INVENTION

1. Field of the Invention

This invention relates to the removal of dissolved sulfides from a sulfuretted carbonate containing water, particularly for the reduction of environmental pollution from discharge of said water, and for recovering hydrogen sulfide therefrom.

2. State of the Art

Carbonate containing waters contaminated with dissolved sulfides occur naturally as waters from subterranean sources, including geothermal sources, and have also resulted from many industrial processes. Such waters include mineral spring waters, condensates of geothermal steam, aqueous condensates from coke oven gases, wash water from scrubbing of industrial gases containing hydrogen sulfide and from gases produced by anaerobic digestion of sulfur-containing organic matter such as sewage and garbage, and effluents from pulp mills, rayon plants, etc. Certain of such contaminated waters, depending on their origin, contain one or more additional contaminants which may include ammonia and substances comprising arsenic and/or mercury. Hydrogen sulfide in aqueous solution is known as hydrosulfuric acid and its oxidation products, sulfurous and sulfuric acids, are corrosive to many metals utilized in industry. Furthermore, hydrogen sulfide is a noxious malodorous material detrimental as an environmental pollutant, as also are the arsenic and/or mercury components referred to.

Heretofore, such contaminated waters have usually been discharged to the environment with resulting odorous and noxious pollution. Attempts to obviate pollution have included processes for the treatment of such waters with air, usually in the presence of a dissolved catalyst, or by chlorination, to oxidize the hydrogen sulfide to elemental sulfur, with consequent pollution of the environment by the resultant non-odorous reaction products. Such abatement practices are expensive as well as creating alternate pollution problems. Other attempts to minimize pollution by such waters have included conventional flashing and stripping, but such processes remove only volatile dissolved sulfides, e.g., dissolved hydrogen sulfide gas, leaving sulfide salts, e.g. ammonium sulfides, sodium sulfides, etc., in the waters, whereby these other practices have been only partially effective.

SUMMARY OF THE INVENTION

The present invention aims to depart from the abatement practices used by the prior art and instead to remove the dissolved sulfides from contaminated carbonate waters containing the same without otherwise polluting the environment, by a process which not only produces such carbonate waters depleted in dissolved sulfides but at the same time also produces carbon dioxide-free hydrogen sulfide as a valuable product. Other objects of the invention are to remove arsenic and/or mercury substances which may also be in such waters, particularly those from geothermal sources. These objects are obtained by dispersing reactant in the carbonate-containing waters contaminated with dissolved sulfides to form a solid metal sulfide reaction product which is essentially free of carbonates, the reactant comprising a metal salt the metal of which is selected from the class of metals having an electrode potential positive with respect to hydrogen in the electromotive series and capable of forming such solid reaction products, separating the decontaminated carbonate containing water phase from the solid reaction products, thereafter decomposing the latter by reacting the same with an aqueous acid comprising the negative radical of said metal salt thereby reforming the metal salt, which is recycled in the process, and forming hydrogen sulfide essentially free of carbon dioxide, which is removed as a valuable product.

In short, the present invention is directed to a new and useful process for producing, from a carbonate-containing solution contaminated with dissolved sulfides, two separate products: (1) said carbonate solution depleted in such sulfides and not further contaminated, and (2) hydrogen sulfide free of carbon dioxide. The process, for this dual purpose, employs a new combination of steps utilizing well known chemical principles. The invention as a whole includes the new purpose of the process and the unique combination of the known principles required to effectuate the same; and in a preferred embodiment of the invention, when the metal salt is a sulfate and the aqueous acid is sulfuric acid, hydrogen sulfide produced as aforesaid may be utilized in the process by chemical conversion to such sulfuric acid.

SHORT DESCRIPTION OF THE DRAWINGS

In the accompanying drawing the single FIGURE is a flow diagram illustrative of the invention.

DETAILED DESCRIPTION

Referring to said flow diagram, the aqueous liquid phase comprising a carbonate solution contaminated with dissolved sulfides from any of the sources aforesaid is supplied via conduit 100 to a reactor 105. Reactant, supplied via 101, preferably in aqueous solution, is dispersed in said liquid phase in a quantity which does not exceed the molar equivalent of dissolved sulfides in said aqueous phase, preferably with the aid of agitation, e.g. conventional mixing apparatus. Said reactant comprises a metal compound, e.g. a water soluble metal salt, the metal of which preferably is selected from the class consisting of the metals having an electrode oxidation potential positive with respect to hydrogen in the electromotive series and which salt is capable of reacting with said dissolved sulfide to form a solid phase metal sulfide reaction product the metal sulfide of which has, at 25° C., a solubility product smaller than $10 \times 10^{-15}$. Preferred metals of such salts, in the order of preference, are zinc, iron and nickel; preferred acid radicals of such salts, in the order of preference, are sulfate and chloride.

Following the reaction in reactor 105, the reaction products are passed via 106 to a separator 107, e.g. a filter, centrifuge, or other separating means, wherein the liquid phase solution depleted in dissolved sulfides is separated, as first product, from the solid metal sulfide reaction product formed by the reaction; the decontaminated carbonate solution being delivered via 108 for appropriate use, or for discharge to the environment; and the solid metal sulfide reaction products being delivered, preferably as a slurry, via 109, e.g. to decomposer 110. In the decomposer 110, the said solid metal sulfide reaction product from 107 is reacted with an aqueous acid comprising the negative radical of the metal salt supplied to the reactor 105 via 101, said acid being supplied to 110 via 112. Said acid enters into a double decomposition with the metal sulfide reaction product to convert the sulfide content thereof to hydrogen sulfide and the metal content thereof to the same metal salt as was supplied to the reactor via 101.

The hydrogen sulfide, being volatile, may be readily separated from the reaction medium in the decomposer 110 and removed therefrom via 114 either as product withdrawn via valved conduit 115 or, in a preferred embodiment where the metal salt is a sulfate, it may be passed wholly or in part by valved conduit 130 to a sulfuric acid production system 131 in which the hydrogen sulfide is oxidized to sulfuric acid by known steps employing oxygen, air and water, as required, supplied via 132. The sulfuric acid formed in 131 is withdrawn by valved conduit 133 and may be employed in whole or in part to supply, via 112, the acid to decomposer 110. Additional acid required for 110 or any surplus acid produced in 131 may be supplied or withdrawn as via 111.

The metal salt reformed by the double decomposition in 110 is removed therefrom via 116, preferably as the aqueous solution remaining at least in part from the aqueous acid supplied via 112. The reformed metal salt from 114 is delivered to the reaction in 105 as all or part of the reactant supplied thereto via 101, by way of recycle conduits 116–118. Where only a part of the reformed metal salt is recycled via 118, the remainder may be drawn off via valved conduit 119, and start-up and make-up of the metal salt reactant may be supplied as via the valved conduit 120.

Precipitation of solid metal sulfide reaction product in reactor 105 may be aided by dispersing in the liquid aqueous reaction medium finely divided solid particulate matter for acting as substrata for such precipitation, this substrata material being removed from 105 with the precipitated reaction products as at 106. Such substrata material may be added as a slurry via 125 and 102, and/or may be carried into 105 by recycle via 123 of a part of the liquid in 116 or as a suspended constituent of the aqueous carbonate flow via 100, and/or may be formed in situ in 105 as by reaction of hydrogen sulfide contained in the contaminated flow 100 with a second metal compound, supplied to the aqueous liquid in 105, the metal of which is selected from the class of metals having an electrode oxidation potential negative with respect to hydrogen in the electromotive series and capable of undergoing reaction with aqueous hydrogen sulfide to form a solid second metal sulfide product e.g. compounds of silver, mercury, arsenic, copper, etc. When a finely divided solid particulate material and/or a said second metal compound is a constituent of the contaminated flow 100, such material or compound not only becomes dispersed in the aqueous liquid reaction medium in 105 to provide said substrata, but in addition the carbonate aqueous flow withdrawn via 108 becomes depleted in said solid particulate material and/or compound. When the flow 100 is also contaminated with a quantity of substance comprising at least one of the elements of the class consisting of arsenic and mercury, such substance will become part of the solid phase formed in 105 and be separated from the liquid phase in separator 107 and remain as insoluble residue in 110, whereby the decontaminated aqueous flow 108 delivered from separator 107 is also depleted in its content of said contaminating substance.

Where solid particulate matter has been supplied to the aqueous reaction medium in 105 as above described and is inert to the acid treatment in 110, then following such treatment the insoluble residue may be removed from 110 directly or may be passed with the solution of reformed metal salt via 116 and valved conduit 121 to a separator 122, e.g. a centrifuge, filter, or other separation means. Where such solid particulate matter is not a contaminant of the aqueous flow 100, it may be suitably treated and recycled, as via 123, 102 for reuse as substrata as aforesaid. Insoluble residue not recycled is withdrawn via 124. The reformed solution from separator 122 is withdrawn via 126 and recycled via 118 as aforesaid.

Carbonate waters referred to herein contain negative radicals of carbonic acid, $HCO_3^-$ and $CO_3^=$, as well as cations associated therewith which may be one or more of $NH_4+$, $Na+$, $K+$, $Ca++$, etc., and such waters may also contain free carbon dioxide in solution which in part dissociates with formation of $H+$ cation; the dissolved sulfides contaminating such waters are present as the negative radicals of hydrosulfuric acid, $HS^-$ and $S^=$, with like cations associated therewith, and may also be present as free hydrogen sulfide in solution which in part also dissociates with formation of $H+$ cations depending on the concentration of $H+$ ions present from other sources.

The pH of such sulfide containing carbonate water reflects only the hydrogen ion $(H+)$ concentration therein, and does not indicate the amount of dissolved sulfides and carbonates therein in the form of dissolved salts. Solutions of carbon dioxide and/or hydrogen sulfide in pure water from 0.1 normal to saturation at 25° C. produce pH values of about 4.0 showing only a small increase in $H+$ ions with increase in concentration, with the $CO_2$ being slightly more acidic than the $H_2S$. The presence of carbonate and sulfide salts in any concentration only slightly alters the pH. A pH of about 4 or lower indicates the absence of dissolved sulfide and carbonate salts, and a higher pH indicates the presence of very little free carbon dioxide and hydrogen sulfide in solution. In sulfide contaminated carbonate water having a pH of about 7.0, a condition appertaining to many such contaminated waters, the dissolved sulfides and carbonates exist in solution essentially entirely in the form of ionized salts.

In carrying out the reaction in 105 this invention has shown that where the aqueous phase contains dissolved carbon dioxide and hydrogen sulfide in undissociated form, and the reactant employed is the metal salt of an acid stronger than hydrosulfuric e.g. sulfate, then the efficiency of removal of the dissolved sulfides as solid metal sulfide reaction product is enhanced by adding to said aqueous reaction medium in 105 as via 103 a quantity of basic substance, i.e. NaOH, $NH_4OH$, $Na_2CO_3$, lime, etc., sufficient to provide in the aqueous phase 106, 107, 108 an increased pH, e.g., a pH in the range of 3.0 to 7.0 when the reactant is a zinc salt and a pH in the range of 5 to 8.5 when the reactant comprises iron, said basic substance reacting with said acid, e.g. forming sodium sulfate, ammonium sulfate, calcium sulfate, etc. Such additions, preferably to provide a pH at the high end of said ranges, will also enhance the efficiency of removal of the said substances comprising arsenic and/or mercury. Another aspect of the present invention is the recovery of ammonia contained in such contaminated water before it is delivered to reactor 105 by adding to such water a quantity of said soluble basic substance other than NH$_4$OH and stripping ammonia from the solution by a countercurrent flow of steam, nitrogen, or other inert gas, and recovering the ammonia from said flow by known means. Such addition of basic substance will cooperate for removal of arsenic and/or mercury as well as for said recovery of ammonia values.

The present invention may employ features of, and may be used in combination with, the invention of my concurrently filed copending application Ser. No. 712,170, now U.S. Pat. No. 4,123,506, issued Oct. 31, 1978, herein incorporated by reference; and/or the unique scrubbing apparatus disclosed in my copending application Ser. No. 655,239 filed Feb. 4, 1976, now U.S. Pat. No. 4,062,663, issued Dec. 13, 1977, and U.S. Pat. No. 4,128,406 issued Dec. 5, 1978 herein incorporated by reference, may be employed as the reactor 105 and/or the decomposer 110 herein.

While there have been described herein what are at present considered preferred embodiments of the invention, it will be obvious to those skilled in the art that modifications, including changes, omissions and substitutions, may be made without departing from the essence and principle of the invention. It is therefore to be understood that the exemplary embodiments are illustrative and not restrictive of the invention, the scope of which is defined in the appended claims, and that all modifications that come within the meaning and range of equivalency of the claims are intended to be included therein.

I claim:

1. A process for separating the sulfide values from an aqueous liquid phase containing minor amounts of dissolved carbonates and dissolved sulfides and producing hydrogen sulfide essentially free of carbon dioxide, which process comprises:
   (a) dispersing reactant in said aqueous liquid phase, said reactant consisting essentially of a quantity of water soluble metal salt the metal of which is selected from the class of metals having an electrode oxidation potential positive with respect to hydrogen in the electromotive series and having the capability of undergoing reaction with dissolved sulfides at a pH not less than 3 to form a solid phase metal sulfide reaction product which is essentially free of carbonates, said metal sulfide having a solubility product at 25° C. smaller than $10 \times 10^{-15}$, said quantity of said metal salt so dispersed essentially not exceeding the molar equivalent quantity of dissolved sulfides in said aqueous liquid phase,
   (b) maintaining the pH of said aqueous liquid phase in step (a) at not less than 3 by addition of a basic substance thereto and effecting said reaction with said dissolved sulfides to form said solid sulfide reaction product and the aqueous liquid phase for step (c)
   (c) separating from said solid metal sulfide reaction product and delivering, as first product of the process, said aqueous liquid phase comprising a carbonate solution but depleted in dissolved sulfides and essentially free of said metal salt,
   (d) decomposing said solid metal sulfide reaction product by reacting the same with an aqueous acid comprising the negative radical of said metal salt, thereby forming hydrogen sulfide essentially free of carbon dioxide and reforming said metal salt,
   (e) removing metal salt reformed in step (d) and delivering the same to step (a) as said reactant, and
   (f) removing, as second product of the process, hydrogen sulfide essentially free of carbon dioxide formed in step (d).

2. A process as claimed in claim 1, wherein said aqueous liquid phase is from a subterranean source.

3. A process as claimed in claim 2, wherein said aqueous liquid phase is condensate of geothermal steam.

4. A process according to claim 2, wherein said aqueous liquid phase also comprises arsenic and/or mercury containing matter, and said matter becomes part of the solid phase formed in step (a) and remains as insoluble residue after step (d).

5. A process as claimed in claim 1, wherein said aqueous liquid phase is condensate from coke oven gas.

6. A process as claimed in claim 1, wherein said aqueous liquid phase is wash liquor from the scrubbing of gas containing hydrogen sulfide.

7. A process as claimed in claim 1, wherein said aqueous liquid phase is wash liquor from the scrubbing of gas produced by anaerobic digestion of sulfur-containing organic matter.

8. A process as claimed in claim 7, wherein the said organic matter contains nitrogen and said wash liquor contains ammonia.

9. A process as claimed in claim 1, wherein the aqueous liquid phase also contains ammonia in solution.

10. A process as claimed in claim 9, wherein the content of said ammonia is approximately twice the molar equivalent quantity of dissolved sulfides in said aqueous liquid phase.

11. A process as claimed in claim 1, wherein said metal salt is a ferrous salt.

12. A process as claimed in claim 11, wherein said ferrous salt is ferrous sulfate.

13. A process as claimed in claim 1, wherein said metal salt is a zinc salt.

14. A process as claimed in claim 13, wherein said zinc salt is zinc sulfate.

15. A process as claimed in claim 1, wherein said reactant comprises both ferrous and zinc salts.

16. A process as claimed in claim 1, wherein said metal salt is supplied to step (a) as an aqueous solution, and said reformed metal salt is removed and delivered in step (e) as an aqueous solution.

17. A process as claimed in claim 1, which further comprises:
   (g) also dispersing in said aqueous liquid phase finely divided solid particulate matter for acting as substrata for precipitation of said metal sulfide reaction product in step (a), said particulate matter being separated as part of said solid phase in step (c) and remaining as insoluble residue after step (d).

18. A process as claimed in claim 17, wherein further comprises:
   (h) recycling to step (g) insoluble residue remaining after step (d) for dispersion in said aqueous liquid phase.

19. A process as claimed in claim 1, wherein said metal salt is a sulfate and said aqueous acid in step (d) is sulfuric acid.

20. A process as claimed in claim 19, which further comprises:
   (g) oxidizing hydrogen sulfide removed in step (f) and converting the same to sulfuric acid, and
   (h) delivering to step (d) sulfuric acid produced by step (g).

21. A process as claimed in claim 1, wherein the said metal salt is a zinc salt of an acid stronger than hydrosulfuric acid and said pH is maintained in the range of 3.0 to 7.0.

22. A process as claimed in claim 1, wherein the said metal salt is a ferrous salt of an acid stronger than hydrosulfuric acid and said pH is maintained in the range of 5.0 to 8.5.

23. A process for separating the sulfide values from aqueous liquid solution containing dissolved carbonates and dissolved sulfides, which process comprises:
   (a) dispersing reactant in said aqueous liquid, said reactant consisting essentially of a quantity of metal compound having the capability of undergoing reaction with said dissolved sulfides at a pH not less than 3 to form a solid metal sulfide reaction product, said metal sulfide having a solubility product at 25° C. smaller than $10 \times 10^{-15}$, said quantity of said metal compound so dispersed essentially not exceeding the molar equivalent quantity of the dissolved sulfides in said aqueous liquid,
   (b) maintaining the pH of said aqueous liquid in step (a) at not less than 3 by addition of a basic substance thereto and effecting in said liquid said reaction between said metal compound and said dissolved sulfides to form therefrom said solid metal sulfide reaction product for step (c) and the aqueous liquid for step (d),
   (c) separating the resulting solid reaction product from the aqueous liquid, and
   (d) discharging the separated aqueous liquid containing carbonates depleted in dissolved sulfides by said reaction and essentially free of said metal compound.

24. A process according to claim 23, wherein said metal compound is an iron compound.

25. A process according to claim 23, wherein said metal compound is a ferrous compound.

26. A process according to claim 23, wherein said metal compound is a zinc compound.

27. A process according to claim 23, wherein said metal compound is a copper compound.

28. A process according to claim 23, wherein said metal compound is a sulfate.

29. A process according to claim 23, wherein said reactant consists essentially of both an iron compound and another metal compound.

30. A process according to claim 29, wherein said other metal is zinc.

31. A process according to claim 29, wherein said iron compound is a ferrous compound.

32. A process according to claim 29, wherein said other metal is copper.

33. A process according to claim 23, wherein the metal compound in step (a) is from the class of metal compounds consisting of hydrated oxides, hydroxides and carbonates.

34. A process according to claim 23, wherein said basic substance is ammonia.

35. A process according to claim 34, wherein said metal compound is a sulfate and ammonium sulfate is also formed by step (b).

36. A process according to claim 23, wherein said basic substance consists essentially of lime.

37. A process according to claim 36, wherein said metal compound is a sulfate and calcium sulfate is also formed by step (b).

38. A process according to claim 37, wherein said metal compound is ferrous sulfate.

39. A process according to claim 23, wherein said reactant in step (a) comprises a metal salt and said basic substance.

40. A process according to claim 39, wherein said metal compound in step (a) is from the class of compounds consisting of hydrated oxides, hydroxides and carbonates.

41. A process according to claim 39, wherein said metal salt is a sulfate, said basic substance is lime and calcium sulfate is formed therefrom.

42. A process according to claim 41, wherein said metal salt is ferrous sulfate.

43. A process according to claim 23, said process further comprising:
   (e) treating said metal sulfide reaction product separated in step (c) to form said metal compound, and
   (f) recycling said metal compound formed in step (e) to step (a).

44. A process according to claim 23, which is employed to control pollution of the environment and wherein in step (d) separated aqueous liquid is discharged into the environment.

45. A process according to claim 23, wherein said aqueous liquid in step (a) is condensate of geothermal steam.

* * * * *